455-601 AU 233 EX
FIP8106 OR 3,851,167

United States Patent [19]
Levine

[11] 3,851,167
[45] Nov. 26, 1974

[54] LIGHT-GUIDE COMMUNICATION SYSTEM WITH IMAGE INTENSIFIER REPEATER ELEMENTS

[75] Inventor: Arnold M. Levine, Chatsworth, Calif.

[73] Assignee: International Telephone and Telegraph Corporation, New York, N.Y.

[22] Filed: Dec. 11, 1972

[21] Appl. No.: 313,876

[52] U.S. Cl. .......... 250/199
[51] Int. Cl. .......... H04b 9/00
[58] Field of Search .......... 250/199, 213 R, 213 VT, 250/217; 350/96 B

[56] References Cited

UNITED STATES PATENTS

| | | | |
|---|---|---|---|
| 3,141,105 | 7/1964 | Pratt | 250/213 VT |
| 3,617,750 | 11/1971 | Walker | 250/199 |
| 3,657,543 | 4/1972 | Rose | 250/199 |

FOREIGN PATENTS OR APPLICATIONS

| | | | |
|---|---|---|---|
| 1,202,418 | 8/1970 | Great Britain | 250/199 |
| 1,022,323 | 3/1966 | Great Britain | 250/199 |

*Primary Examiner*—Benedict V. Safourek
*Assistant Examiner*—George H. Libman
*Attorney, Agent, or Firm*—William T. O'Neil

[57] ABSTRACT

A system for long distance transmission of high bandwidth signals or multiple signals, as for example, in submarine cable service. A high bandwidth signal is split into frequency increments by selective down-conversion for each such increment. A plurality of electrical-to-light transducers are each modulated by the electrical signal corresponding to one of the frequency increments, and a fiber-optic light transmission system transmits each of these transducer outputs to a like plurality of light-to-electrical signal transducers at a receiving end. The multiple outputs from these second transducers are up-converted and mixed together, so that the original wideband signal is recreated. At intervals along the fiber optic waveguide or optical transmission lines used, image intensifiers are used as repeater elements to provide optical amplification.

10 Claims, 3 Drawing Figures

LIGHT-GUIDE COMMUNICATION SYSTEM WITH IMAGE INTENSIFIER REPEATER ELEMENTS

BACKGROUND OF THE INVENTION

1. Field of the Invention

The invention relates to cable transmission of electrical signals over long distances. More specifically, the invention relates to systems in which signal data is transmitted by modulated light through a fiber optic bundle, or optical cable.

2. Description of the Prior Art

In the prior art, the long distance cable transmission of electrical signals has been affected by various arrangements. Among the systems known in this art are the so-called coaxial cable systems. In a well known form of such a system, a high radio frequency carrier is variously modulated by carriers and subcarriers in order that multiple messages may be carried in the same transmission line. Submarine cables, and for that matter, land cables for long distance usually involve the use of repeaters in order to boost the level of signal which has been gradually attenuated as it progresses down the transmission line. Such amplification, particularly in submarine cable systems, must be extremely reliable since for all practical purposes, it cannot be maintained or repaired. If multiplexing, especially frequency multiplexing, where a number of parallel signal lines are employed, is to be used, individual repeater amplifiers at each repeater station are required for these parallel channels. In general, the cost of high reliability transmission lines for long distance conveyance of high bandwidth signals by known technique is relatively expensive. Moreover, at any point where the cable itself is subject to tampering, it can relatively easily be now distinctively tapped or monitored, so that the security of message information transmitted therethrough, is low. The manner in which the present invention improves upon the state of this art will be evident as this description proceeds.

Certain elements and prior art aspects of the combination of the present invention are known per se and are described in the technical literature. For example, the so-called fiber-optic light-guide construction is described in a number of U.S. patents. Among these are U.S. Pat. No. 3,455,625, entitled "Optical Fiber Bundle Coupling System" (C. H. Brumley et al., U.S. Pat. No. 3,475,076, entitled "Fiber Optic Window and Method of Mounting Same" (R. E. Nelson), and U.S. Pat. No. 3,541,341, entitled "Redundant Fiber-Optic Light Guide Construction" (B. D. Leete).

The so-called image intensifier is also variously described in the literature including RCA Technical Note No. 268 of June 1959 and an article entitled "Passive Vision Aids Pierce Viet Nam Night" which appeared in the magazine "Aviation Week and Space Technology" on June 3, 1968.

Various other aspects of the current techniques known and necessasry for the implementation of the present invention are described in the text entitled "Electro-Optical Photography at Low Illumination Levels" by Harold V. Soule, a John Wiley and Son publication. That test describes the characteristics of electronically excited phosphors and image intensifiers in considerable detail.

The prior art, in respect to construction of image intensifiers, includes the knowledge of appropriate phosphor screens and photo-emissive cathodes for use therewith.

The inter-connection of fiber-optic plates or conductors with image intensifier structures, is known, per se. The characteristics of fiber-optic bundles or "light pipes" for the collimation of light images, is known and therefore, the techniques for associating the fiber-bundle light guide cables envisioned in the present invention to the periodically located image intensifier repeater stations will be apparent to those skilled in this art.

SUMMARY OF THE INVENTION

In consideration of the foregoing state of the prior art and the disadvantages of prior art systems as hereinbefore described, it may be said to be the general objective of the present invention was to provide a highly reliable, relatively secure and relatively low-cost, high bandwidth electrical data transmission system adapted for long distance transmission.

In accordance with the present invention, a relatively high bandwidth signal is applied in parallel to a number of super heterodyne converters, each discretely tuned to a selected frequency increment of the overall passband corresponding to the input signal to be accommodated. A plurality of more limited bandwidth signals, each corresponding to a frequency increment of the aforementioned much broader spectrum is thereby obtained. Each of these signals thereby corresponding to a discrete frequency increment of said broader spectrum is applied to an electric-to-light transducer. Thereafter, an intensity modulated light beam from each transducer is guided down a corresponding discrete "light pipe," each so-called "light pipe" being a fiber of an optical cable or fiber-optic bundle. After a predetermined distance, the light amplitude, or intensity in the fiber-optic transmission medium tends to become attenuated much as electrical signals are attenuated in electrical transmission lines. Accordingly, at appropriate locations along a long cable system utilizing the present invention, repeaters are used. Each of these repeaters includes an image intensifier which receives light in a discrete pattern from the "light pipes" of the bundle and boosts the optical intensity before transmitting it along an additional length of cable in corresponding "light pipes." At the final terminal, light-to-electric signal transducers are employed, one to each of the individual "light pipes." Accordingly, a set of electrical signal lines results at the output of these transducers and the discrete signal thereon correspond to the aforementioned range increments from the initial set of down-converting mixers. Thereafter, the signals are up-converted and then mixed together, thereby recreating the original wideband signal which was to be transmitted.

DESCRIPTION OF THE PREFERRED EMBODIMENT

Figures 1, 2, 3:
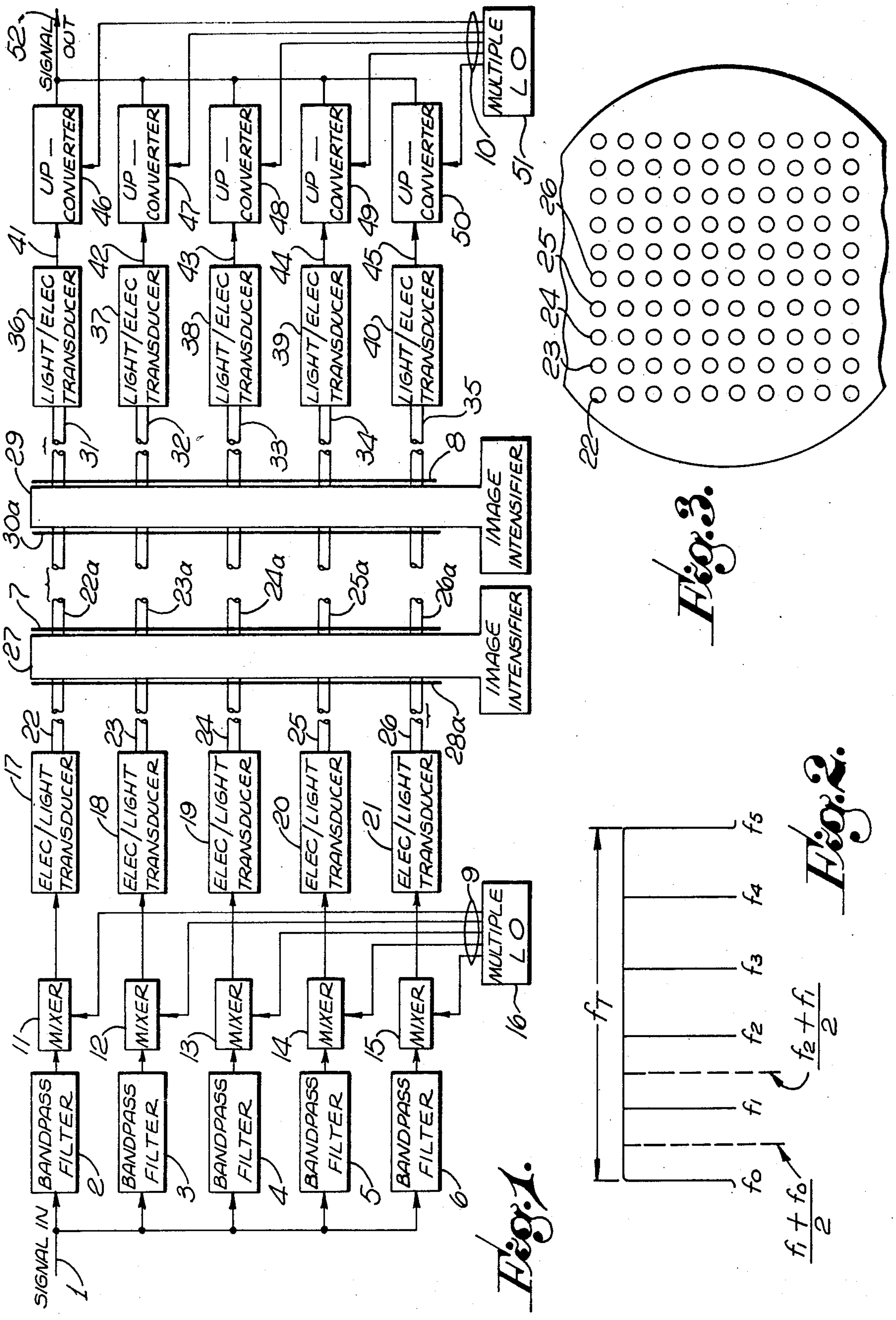
FIG. 1 is a block diagram illustrating the system of the present invention.
FIG. 2 is a frequency bandpass diagram illustrating division into an arbitrary number of frequency increments.
FIG. 3 is a typical arrangement of multiple "light pipe" connections against either the input or output face of an image intensifier used in the configuration of FIG. 1.

Referring now to FIG. 1, the combination of the invention will be described in detail.

As would be typical for a long distance cable transmission system, it will be assumed that the signal input at 1 comprises a broad spectrum signal, perhaps as much as 100 MHz in spectral coverage. This description of the system of FIG. 1 will be made with occasional reference to FIG. 2, so that the various aspects of the system and its operation will be more readily understood.

The passaband containing this wide spectrum signal 1 is represented on FIG. 2 as $f_T$. A form of frequency division multiplexing is undertaken at the outset in the system of FIG. 1. If the passband required to accept the signal ($f_T$) is divided into a number of range increments, a corresponding plurality of signals can be generated by heterodyne conversion. Although in a practical instrumentation, the number of such range increments might be quite large, (i.e., as many as 100 increments or more), the number of increments chosen for illustrative purposes in accordance with FIG. 1 and FIG. 2 is 5. These discrete range increments can be "carved out" of the total spectrum $f_T$ by bandpass filters, 2, 3, 4, 5 and 6, those bandpass filters having frequency passbands corresponding to f1-f0, f2-f1 $f3$–$f2$, $f4$–$f3$ and finally $f5$–$f4$, respectively. The centers of these passbands are obviously first $f1$+FO/2, $f2$+$f1$/2, etc., and these center increment frequencies may be thought of as an intermediate or nominal conversion frequency centerpoint in each instance. A multiple local oscillator 16 provides a number of signals on a plurality of leads collectively identified as 9 on FIG. 1, one each to mixers 11, 12, 13, 14 and 15. The local oscillator frequencies provided on the leads 9 are separated by the incremental center-to-center frequency difference, and in each instance they operate to down-convert the particular range increment to the region $f1$–$f0$ or lower. If the actual region $f1$–$f0$ is chosen as the common down-converted output frequency range, then obviously, no mixer is necessary for that increment, only a bandpass filter centered about the said $f1$+FO/2 frequency and having the prescribed $f_T/5$ spectral width, for generality, however, it will be assumed that each frequency increment requires this conversion. Suffice it to say, each of the mixers 11 through 15 has an output in the chosen down-converted frequency region, and these outputs are supplied respectively to the electric-to-light transducers 17, 18, 19, 20 and 21. It is to be understood that mixers 11 through 15 would contain the necessary power amplification to drive the transducers 17 through 21, which may be instrumented in any of several known ways. One of the most attractive and least expensive transducers of this type, is the so-called light emitting diode (LED). These devices are well known and have light emission vs. excitation signal responses which are suitable in the combination of the present invention. Another suitable arrangement for the transducers 17 through 21 can be provided by light intensity modulated laser beam generators. These too are known in the general electronic arts, and are capable of generating more intense light than are the aforementioned light emitting diodes (LEDs), although the lasers are inherently more expensive.

From here on, the signal is in the form of light and the "light pipes" 22, 23, 24, 25 and 26 conduct the modulated light output from the transducers 17 through 21, respectively, to the point of the first image intensifier repeater station 27. After the first image intensifier, these "light pipes" continue in 22*a*, 23*a*, 24*a*, 25*a* and 26*a*, respectively, and after the second image intensifier 29, they also continue in "light pipes" 31, 32, 33, 34 and 35, respectively.

Neglecting the function of the image intensifiers 27 and 29, for the moment, it will be seen that the transmitted light signal down each of the individual light pipes comprised in the fiber-optic bundle (optical cable) ends in 5 discrete reverse transducers, 36, 37, 38, 39 and 40, respectively. These reverse (light-to-electric) transducers accomplish the opposite function as compared to transducers 17 through 21, in that they provide respective electrical output signals 41, 42, 43, 44 and 45, which are the electrical analogs of the individual light intensities extant at the end of the fiber-optic bundle as it delivers its multiple signal light outputs to the transducers 36 through 40.

Accordingly, on the output leads 41, 42, 43, 44 and 45, electrical signals descriptive of the signals within the passbands of the filters 2 through 6, respectively, are recreated at a remote point. All that remains is the restoration of the original passband $f_T$ by combining the signals 41 through 45 in a process which is the reverse of that affected in mixers 11 through 15. That is to say, up-converters 46, 47, 48, 49 and 50 are driven from a second multiple L local oscillator 51, which provides an LO signal set 10 for reconverting the formerly down-converted frequency increments to their proper place in the total spectrum $f_T$. Accordingly, if mixer 12 down-converts the increment $f2$–$f1$ to the realm $f1$–$f_o$ or some arbitrary relatively low frequency band, then up-converter 47 operates to restore it to its rightful place, i.e., between $f1$ and $f2$ on FIG. 2. Thus, it will be seen that the combination of the outputs of the up-converters 46 through 50 on an output signal terminal 52 provides a reproduction of the original signal at terminal 1.

The purpose of the down-conversion and later up-conversion operation just described is to accommodate the bandwidth characteristics of the light transducer elements and even to a greater extent, the characteristics of the image intensifier phosphors 7 and 8, which will now be described.

Going back to the image intensifiers 27 and 29, with their respective photocathode surfaces 28*a* and 30*a* and their respective output phosphors 7 and 8, the nature and operation of the repeater stations may now be described.

It will be readily understood that any long distance land or submarine data transmission system in accordance with the present invention would require long light cables, and the attenuation of light, as it travels the length of these cables, is obviously the same general type of problem in that respect as encountered in purely electrical transmission lines over great distances. Two repeater, or image intensifier stations 27 and 29, have been shown for example, although it will be understood that many more would actually be required in a practical system.

The means for providing energizing potentials to these image intensifiers have not been shown, however, the amount of electrical power involved is low, and accordingly, can be supplied by local long life primary batteries, or by simple electric cable conductors paralleling the fiber-optic bundle, the latter comprising the main information bearing "cable."

As understood from the prior art, for example the RCA Technical Note hereabove identified, each image intensifier has a photo emissive cathode, frequently referred to merely as a photo cathode. Also, each intensifier has a phosphor screen. Between the photo cathode and the phosphor screen is a microchannel plate of glass or other similar insulating material. A very large number of very small axial holes pass through these microchannel plates, said holes ranging down to a few microns in diameter. Inside the holes in the microchannel plate, a secondary emissive material responds to electrons emitted by the photo cathode in response to a light pattern thereon. Thus, amplification of the emitted electrons occurs and these electrons impinge on a phosphor surface 7 in the case of intensifier 27, and on 8 in a case of intensifier 29.

If the input light pipes from the group 22 through 26 are aligned (a requirement) with those in the 22a through 26a group, the result will be an intensified light pattern so that light passing down for example, through 22*a*, is a much intensified replica of that in 22.

It should be emphasized at this point that, using the microchannel type of image intensifier, each of the microchannel plates includes several orders of magnitude more microchannel plate holes than there are individual light pipes. It should also be emphasized that other types of image intensifiers using the photo cathode surface and the output phosphor screen but no microchannel plate, are extant, and useable in the combination of the present invention.

Referring to FIG. 3, which is drawn to illustrate the more practical instance in which there might be as many as 100 light pipes and corresponding subdivisions of the input signal spectrum rather than the mere 5, chosen for illustration in FIG. 1, there would therefore be a large number of microchannel plate holes falling within the diameter of each of the so-called light pipes 22 through 26.

The structure and operation of intensifier 29, with its photo cathode 30a and phosphor screen 8, is the same as for 27, and correspondingly, each of its output light pipes, for example 32, would be aligned with a corresponding input pipe on the photo cathode surface A (in that instance, 23*a*).

In a practical situation, where the spectral width of the input signal 1 is on the order of 100 MHz, the individual frequency increments (fractions of $f_T$) might be as much as 10 MHz in width, or as little as 1 MHz in width. A selection would be made based on cost and equipment complexity and also required signal-to-noise ratio performance and other technical considerations.

It was indicated hereabove that the phosphor screens 7 and 8 probably provide the most significant limitation in the individual bandwidth capability of each light pipe channel. A so-called *p*-16 phosphor, which is a cathode-ray-excited phosphor considered suitable for photographic operations, provides a bandwidth or frequency response on the order of 10 MHz. Accordingly, it would appear that probably 10 channels designed for approximately 10 MHz of bandwidth per light pipe channel, would be the simplest system which could be effectively instrumented to approximate the 100 MHz bandwidth required at the input 1.

It will be realized that the non-destructive tapping or monitoring of a light pipe channel is much more difficult than the relatively simple procedure for tapping electrical transmission lines. Frequently such electrical transmission lines are tapped by magnetic coupling means or high impedance probes in a manner not detected from either the sending or receiving ends. The security provided by the combination of the present invention is thus a significant feature. Significantly improved signal-to-noise ratios, as compared to prior art electric signal transmission cable arrangements, are achieved, a fact well understood by those acquainted with intelligence transmission by modulated contained light beams. The inherent reliability of the image intensifier elements used is very much greater than provided by thermionic amplifier arrangements, and is comparable, or possibly better than achieved with present day solid state amplifier arrangements. Among the reasons for this is the non-susceptibility of the image intensifier to change from light signal overloading or overdriving as a result of noise or signal anomalies.

For convenience herein, the individual fiber-optic conductors in the fiber optic cable (bundle) have been referred to as light pipes and light conductors, terms known and used in this art. The terms "fiber-optic light guide means" or "light guide" also refer to these light pipes or collectively to a bundle or cable comprising a number of individual fibers.

Various modifications will occur to the reader skilled in the related arts. Accordingly, it is not intended that the scope of the present invention shall be limited to the embodiment illustrated or described herein, the drawing and description being typical and illustrative only.

What is claimed is:

1. A system for distance transmission of plural signals having information content, comprising:

first means for converting said signals into a plurality of intensity modulated light beams each corresponding to a signal channel;

light guide means including a plurality of fiber optic light waveguides, at least one of which is connected to receive and conduct a corresponding one of said intensity modulated light beams of a corresponding signal channel;

second means responsive to said light guide means for discretely converting each of said modulated light beams into corresponding amplitude modulated electrical signals;

and third means including at least one image intensifier having an input and an output and being inserted at a point along the length of said light guide means, said light guide means being interrupted by insertion of said intensifier in series, said third means thereby operating to receive a mosaic of light patterns at said input comprising the light output of each fiber of said light guide at said insertion point to produce a corresponding intensified mosaic of light patterns at said output and to apply said output light patterns discretely to corresponding discrete fibers of said light guide continuing from said output of said image intensifier.

2. A system for cable transmission of amplitude modulated electrical signals of broad spectral content from a transmitting location to a relatively remote receiving location, comprising:

first means at said transmitting location for separating the spectrum of said signals into a plurality of N frequency increments each containing a predetermined fraction of said spectrum, said first means having N discrete outputs, one corresponding to each of said increments;

second means at said transmitting location comprising N heterodyne conversion channels responsive to said N discrete first means outputs on a one-for-one basis, and N discrete outputs, said conversion channels each including a corresponding source of local oscillator signal of a frequency such that said N discrete outputs each contain signals representative of a corresponding one of said frequency increments and all of said outputs of said second means are in substantially the same frequency band;

third means at said transmitting location comprising N first transducers responsive to said N second means outputs on a one-for-one basis, said first transducers being adapted for converting an amplitude modulated electrical signal to a corresponding intensity modulated light beam;

a fiber-optic cable comprising N light conductors connected on a one-for-one basis to said N transducers of said third means;

at least one image intensifier having light input and output surfaces inserted in series with said light conductors, between said transmitting location and said receiving location, each of said conductors having a connection to corresponding areas of said input and output surfaces;

fourth means comprising N second transducers connected to said N light conductors at said receiving location on a one-for-one basis, said second transducers being adapted for converting said intensity modulated light beams to corresponding amplitude modulated electrical signals, said second transducers further having N corresponding outputs thereby to substantially reproduce the outputs of said second means;

and fifth means comprising N heterodyne upconverters responsive to the N outputs of said fourth means on a one-for-one basis, said upconverters each including a corresponding source of local oscillator signal of a frequency such that said fourth means outputs corresponding to said frequency increments are restored to their respective frequency positions within the input to said first means, thereby to substantially reproduce said amplitude modulated signal of broad spectral content.

3. Apparatus according to claim 2 in which said image intensifiers are further defined in that said input surface comprises a photo-cathode for converting light to electron emission, said output surface comprises a phosphor surface responsive to electronic excitation for converting electron emission to light output, and a microchannel plate is included between said photocathode and said phosphor surface, said plate having microchannel surfaces which are secondarily emissive for increasing the electron emission reaching said phosphor surface as a result of excitation of said photocathode surface.

4. Apparatus according to claim 2 further defined in that said first transducers are light emitting diodes and said second transducers are photo-diodes.

5. Apparatus according to claim 2 in which said first transducers are intensity modulated laser beam generators.

6. Apparatus according to claim 2 in which said first transducers are light emitting diodes.

7. Apparatus according to claim 3 further defined in that said first transducers are light emitting diodes and said second transducers are photo-diodes.

8. Apparatus according to claim 3 in which said first transducers are intensity modulated laser beam generators.

9. Apparatus according to claim 3 in which said first transducers are light emitting diodes.

10. Apparatus according to claim 3 in which said phosphor surface is defined as having rapid build-up and decay characteristics and therefore a high frequency response.

* * * * *